United States Patent [19]

Hiraiwa

[11] 4,159,051
[45] Jun. 26, 1979

[54] HYDRAULIC CLUTCH CONTROL SYSTEM

[75] Inventor: Kazuyoshi Hiraiwa, Ome, Japan

[73] Assignee: Nissan Motor Company, Limited, Japan

[21] Appl. No.: 719,104

[22] Filed: Aug. 31, 1976

[30] Foreign Application Priority Data

Sep. 3, 1975 [JP] Japan ................................ 50-107454

[51] Int. Cl.² ............................................. F16D 47/00
[52] U.S. Cl. ............................... 192/0.075; 192/0.034; 192/109 F
[58] Field of Search ..................... 192/3.3, 3.33, 0.034, 192/0.075, 86, 109 F

[56] References Cited

U.S. PATENT DOCUMENTS

| 2,675,102 | 4/1954 | Robinson | 192/86 X |
| 2,824,632 | 2/1958 | Lucia et al. | 192/3.3 |
| 3,395,617 | 8/1968 | Kaptur | 192/0.075 |
| 4,051,932 | 10/1977 | Arai et al. | 192/3.3 |

FOREIGN PATENT DOCUMENTS 1207727 12/1965 Fed. Rep. of Germany ............. 192/86

Primary Examiner—William E. Wayner
Assistant Examiner—Harold Joyce
Attorney, Agent, or Firm—Robert E. Burns; Emmanuel J. Lobato; Bruce L. Adams

[57] ABSTRACT

A hydraulic control system for a hydraulic clutch for a transmission is provided with means for temporarily reducing a line or control pressure fed to the clutch only during disengagement of the clutch.

6 Claims, 3 Drawing Figures

HYDRAULIC CLUTCH CONTROL SYSTEM

BACKGROUND OF THE INVENTION

The present invention relates generally to a hydraulic control system for a hydraulic power clutch used for a semi-automatic transmission and particularly to a hydraulic control system of this type which comprises control means for temporarily reducing to a predetermined suitable valve a line or control pressure fed to a hydraulic clutch during disengagement of the clutch.

As is well known in the art, a semi-automatic transmission is provided with a hydraulic power clutch which is combined with a hydraulic torque converter. The clutch is engaged by feeding a line or control pressure outside of a cylinder formed by a clutch cover to cause a piston to force a clutch disk against the clutch cover and is disengaged by feeding the line pressure inside of the cylinder to move the piston away from the clutch disk. The line pressure employed for the engagement and disengagement of the clutch is usually controlled in accordance with the load of the engine. A conventional hydraulic control system for a hydraulic clutch has applied to the clutch a line or control pressure which has a similar value irrespective of the engagement and disengagement of the clutch when the engine load is the same. However, it is desirable that hydraulic fluid pressure used for the disengagement of the clutch is lower than hydraulic fluid pressure used for the engagement of the clutch. This is because the higher the hydraulic fluid pressure is which is employed for the disengagement of the clutch, the greater a force is which acts on a snap ring provided for limiting movement of the piston during disengagement of the clutch and as a result it becomes necessary to increase the strength, size and weight of the snap ring and the clutch cover. This causes an increase in a production cost of the clutch.

SUMMARY OF THE INVENTION

It is, therefore, an object of the invention to provide a hydraulic control system for a hydraulic clutch which system comprises control means for temporarily reducing to a predetermined suitable value a line or control pressure fed to a hydraulic clutch during disengagement of the clutch so that it is avoided to unnecessarily increase the strength, size and weight of the snap ring and the clutch cover and to unnecessarily make the clutch expensive.

BRIEF DESCRIPTION OF THE DRAWINGS

This and other objects and advantages of the invention will become more apparent from the following detailed description taken in connection with the accompanying drawings in which.

DESCRIPTION OF THE PREFERRED EMBODIMENTS

Figure 1:
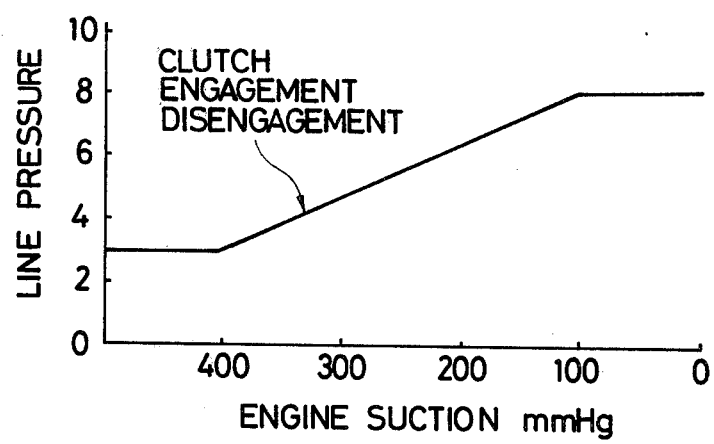
FIG. 1 is a graphic representation of the relationship between the engine suction and a line or control pressure provided by a conventional hydraulic control system and the value of which is the same irrespective of the engagement and disengagement of a clutch.

Referring to FIG. 1 of the drawings, there is shown the relationship between the engine suction and a line or working pressure provided by a conventional hydraulic control system for a hydraulic power clutch for the engagement and disengagement of the clutch. As shown in FIG. 1, the value of the line pressure is the same irrespective of the engagement and disengagement of the clutch and is similarly varied in accordance with the engine suction during engagement and disengagement of the clutch.

Figure 2A:
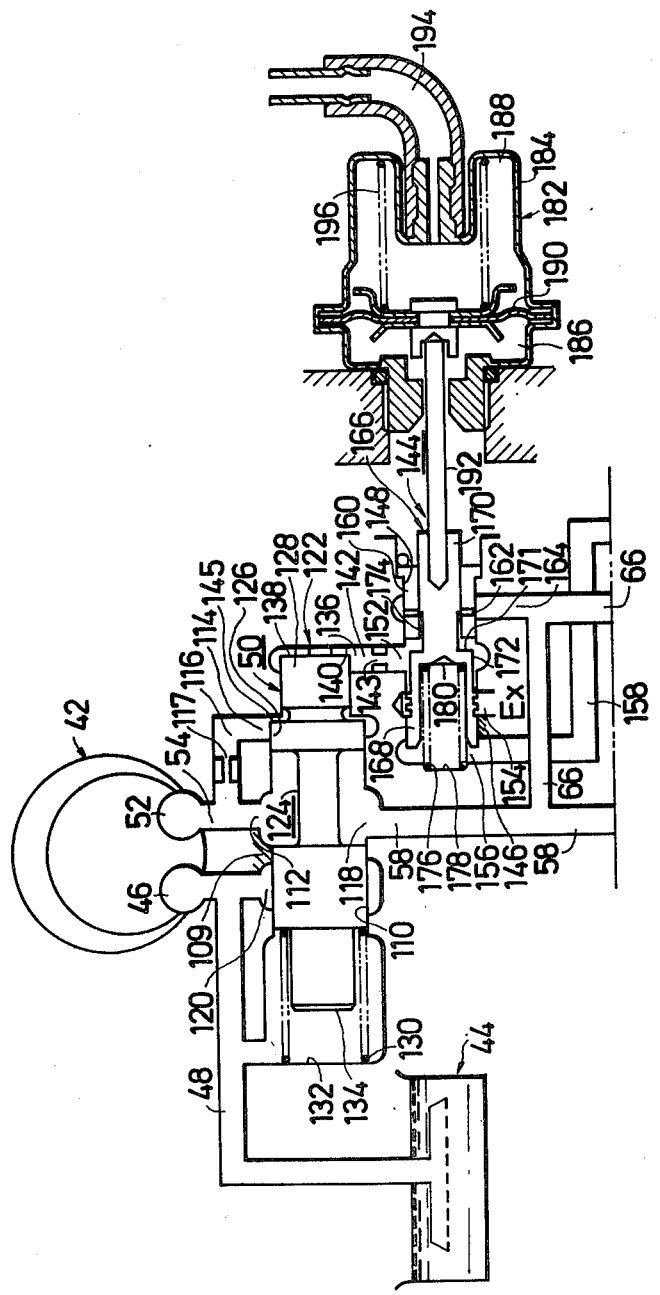
FIG. 2 is a schematic cross sectional view of a preferred embodiment of a hydraulic clutch control system according to the invention.
Figure 2B:
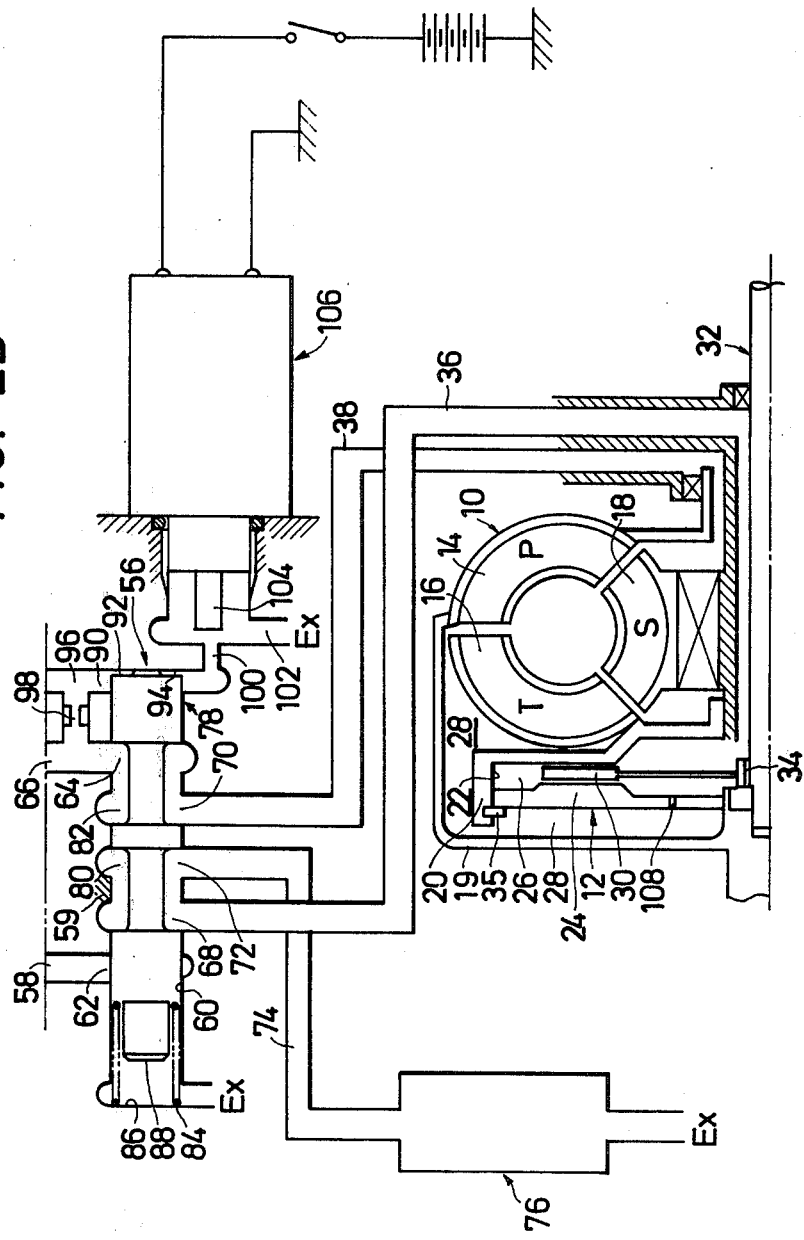

Referring to FIG. 2 of the drawings, there is shown a hydraulic torque converter 10 and a hydraulic power clutch 12 for a semi-automatic transmission (not shown) of a motor vehicle (not shown) and a hydraulic control system according to the invention which is combined with the torque converter 10 and the clutch 12. The torque converter 10 includes a vaned impeller or pump 14 driven from an engine of the vehicle, a vaned turbine 16 hydrokinetically driven by the impeller 14, and a vaned stator or reaction element 18. The clutch 12 is enclosed in a housing 19 of the torque converter 10 and includes a clutch cover or housing 20 integral with the turbine 16 and forming a cylinder 22, a piston 24 slidably fitted in the cylinder 22 and defining a first chamber 26 in the cylinder 22 and a second chamber 28 in the converter housing 19 and outside the cylinder 22, and a clutch disk 30 interposed between the clutch cover 20 and the piston 24. The clutch disk 30 is operatively connected to an input shaft 32 of the transmission through a spline 34. A snap ring 35 is securely fixed to the clutch cover 20 to limit the movement of the piston 24 away from the clutch disk 30 during disengagement of the clutch 12. A passage 36 communicates with the first chamber 26 to supply pressurized hydraulic fluid thereinto. A passage 38 communicates through the interior of the torque converter 10 with the second chamber 28 to supply pressurized hydraulic fluid thereinto. When hydraulic fluid pressure is fed into the second chamber 28, the first chamber 26 communicates with a drain line through the passage 36 as described later and the piston 24 is forced by the hydraulic fluid pressure in the second chamber 28 toward the clutch disk 30 to press same against the clutch cover 20 to engage the clutch 12. On the contrary, when hydraulic fluid pressure is fed into the first chamber 26, the second chamber 28 communicates with a drain line through the interior of the torque converter 10 and the passage 38 as described later and the piston 24 is forced away from the clutch disk 30 to release the clutch 12.

The hydraulic control system, generally designated by the reference numeral 40, comprises a pump 42, and a hydraulic fluid sump or tank 44 communicating with an inlet port 46 of the pump 42 through a passage 48, a pressure regulator valve 50 communicating with an outlet or discharge port 52 of the pump 42 through a passage 54, and a clutch control valve 56 communicating with the pressure regulator valve 50 through a passage 58. The pump 42 draws hydraulic fluid from the hydraulic fluid tank 44 and discharges pressurized hydraulic fluid into the passage 54 to produce a line or control pressure for controlling the clutch 12 in the passages 54 and 58. The line pressure in the passages 54 and 58 is regulated in accordance with the load of the engine by the pressure regulator valve 50 as described hereinafter.

The clutch control valve 56 comprises a valve body 59 defining therein a bore or valve chamber 60 which has first and second inlet ports 62 and 64 communicating respectively with the passage 58 and a passage 66 branching off therefrom, first and second outlet ports 68 and 70 communicating respectively with the passages 36 and 38, and a drain port 72 communicating with the hydraulic fluid tank 44 through a passage 74 and a hydraulic fluid cooler 76. A valve spool 78 is slidably fitted in the valve chamber 60 and is formed therein with first and second annular grooves 80 and 82. The valve spool 78 has and is movable between a first position in which the first annular groove 80 provides communication between the first inlet and outlet ports 62 and 68 and the second annular groove 82 provides communication between the second outlet port 70 and the drain port 72 and a second position shown in FIG. 2 in which the first annular groove 80 provides communication between the first outlet port 68 and the drain port 72 and the second annular groove 82 provides communication between the second inlet and outlet ports 64 and 70. A compression spring 84 is interposed between one end wall 86 of the bore 60 and one end 88 of the valve spool 78 and urges the valve spool 78 into the second position. The bore 60 further has a third inlet port 90 opening into the bore 60 between the other end 92 of the valve spool 78 and the other end wall 94 of the bore 60. The third inlet port 90 communicates with a passage 96 communicating with the passage 66 and formed therein with an orifice 98. The inlet port 90 also communicates through the bore 60 with a drain port 100 communicating with a drain line 102. A control valve 104 is provided to open and close the drain port 100. A solenoid 106 is provided to cause the control valve 104 to close and open the drain port 100 when energized and deenergized or vice versa, respectively. When the drain port 100 is closed, the hydraulic fluid pressure in the third inlet port 90 is increased to a value equal to or near the line pressure to move the valve spool 78 into the first position in opposition to the force of the spring 84. As a result, communication is provided between the passages 58 and 36 and between the passages 38 and 74 to release the clutch 12. On the contrary, when the drain port 100 is opened, the hydraulic fluid pressure in the third inlet port 90 is drained into the drain line 102. Accordingly, the hydraulic fluid pressure in the inlet port 90 is too low to move the valve spool 78 to allow the spring 84 to force the valve spool 78 into the second position. As a result, communication is provided between the passages 66 and 38 and between the passages 36 and 74 to engage the clutch 12. The piston 24 is formed therethrough with an orifice 108 which provides communication between the first and second chambers 26 and 28. Accordingly, when the line pressure is fed into the chamber 28, the line pressure flows from the chamber 28 into the chamber 26 through the orifice 108. At this time, a back pressure is generated in the chamber 26 due to a flow line resistance in the hydraulic fluid cooler 76. The back pressure is one of factors for deciding the line pressure.

The pressure regulator valve 50 comprises a valve body 109 defining therein a bore or valve chamber 110 which has first and second inlet ports 112 and 114 communicating respectively with the passage 54 and a passage 116 branching off therefrom and formed therein with an orifice 117, an outlet port 118 communicating with the passage 58, and a drain port 120 communicating with the hydraulic fluid tank 44. A valve spool 122 is slidably fitted in the bore 110 and is formed therein with an annular groove 124 and has large and small lands 126 and 128 into the bore 110 between which the second inlet port 114 opens. When the valve spool 122 is moved in a first direction or leftwards in the drawing, the annular groove 124 provides communication between both the passages 54 and 58 and the drain port 120 or increases the effective cross sectional area of a flow path of hydraulic fluid from the passages 54 and 58 to the drain port 120 to reduce the line pressure. On the contrary, when the valve spool 122 is moved in a second direction or rightwards in the drawing, the valve spool 122 obstructs communication between both the passages 54 and 58 and the drain port 120 or the annular groove 124 reduces the effective cross sectional area of the flow path of hydraulic fluid from the passages 54 and 58 to the drain port 120 to increase the line pressure. A compression spring 130 is interposed between one end wall 132 of the bore 110 and one end 134 of the valve spool 122 and urges the valve spool 122 in the second direction. The bore 110 further has a third inlet port 136 opening into the bore 110 between the other end 138 of the valve spool 122 or an end 138 of the land 128 and the other end wall 140 of the bore 110 and communicating with a passage 142 which is formed therein with an orifice 143 and is provided therein with a control or modulator pressure $P_M$ as described later. The valve spool 122 is urged in the first direction by the line pressure $P_L$ in the passage 116 acting on the difference $A_1$ between the areas of or a step 145 between the lands 126 and 128 and the modulator pressure $P_M$ in the passage 142 acting on the area $A_2$ of the end 138 of the land 128 in opposition to the force $K_1$ of the spring 130. The following equation is obtained:

$$P_L A_1 + P_M A_2 = K_1 \qquad (1)$$

From the equation (1), the line pressure $P_L$ is expressed as $$P_L = (K_1 - P_M A_2)/A_1 \qquad (2)$$

From the equation (2), it will be understood that as the modulator pressure $P_M$ is increased, the line pressure $P_L$ is reduced.

A modulator valve 144 is provided which produces the modulator pressure $P_M$ reduced and increased respectively with increases and decreases in the load of the engine and comprises a valve body 146 defining therein a bore or valve chamber 148 which has an outlet port 152 communicating with the passage 142, a drain port 154 communicating with a drain line (not shown), and a first inlet port 156 communicating with the passage 96 through a passage 158. A sleeve 160 is fixedly fitted in a part of the bore 148 and is formed therethrough with a second inlet port 162 communicating with the passage 66 through a passage 164. A valve spool 166 is slidably located in the bore 148 and comprises first and second portions 168 and 170 which are fitted respectively in the bore 148 and the sleeve 160 and are integral with each other. The diameter of the first portion 168 is larger than that of the second portion 170. The outlet port 152 communicates with the differential area $A_3$ of or a step 171 between the first and second portions 168 and 170. The valve spool 166 has a first annular groove 172 formed in the first portion 168 and a second annular groove 174 formed in the second portion 170. When the valve spool 166 is moved in a first direction or rightwards in the drawing, the second groove 174 provides communication between the inlet and outlet ports 162 and 152 or increases the effective cross sectional area of a flow path of the line pressure from the port 162 to the port 152. As a result, the line pressure is admitted into the passage 142 or the line pressure admitted thereinto is increased to increase the modulator pressure $P_M$ in the passage 142. On the contrary, when the valve spool 166 is moved in a second direction or leftwards in the drawing, the first groove 172 provides communication between the outlet and drain ports 152 and 154 or increases the effective cross sectional area of a flow path of hydraulic fluid from the port 152 to the port 154. As a result, hydraulic fluid is exhausted in the drain port 154 or the hydraulic fluid drained is increased to reduce the modulator pressure $P_M$ in the passage 142. A compression spring 176 is interposed between an end wall 178 of the bore 148 and one end 180 of the valve spool 166 and urges the valve spool 166 in the first direction. A diaphragm unit 182 is provided to adjust the modulator pressure $P_M$ in accordance with the load of the engine and comprises a housing 184 having first and second chambers 186 and 188, and a flexible diaphragm 190 separating the chambers 186 and 188 from each other and operatively connected to the second portion 170 of the valve spool 166 through a push rod 192. The first chamber 186 communicates with the atmosphere, while the second chamber 188 communicates with an intake passageway (not shown) downstream of a throttle valve (not shown) of the engine or with an intake manifold (not shown) thereof through a passage 194 and is fed with an intake passageway vacuum or engine suction. A spring 196 is provided to urge the diaphragm 190 in a direction opposed by the atmospheric pressure in the first chamber 186. When the load of the engine is increased to reduce the engine suction, the biasing force F of the push rod 192 is increased to move the valve spool 166 in the second direction to reduce the moduclator pressure $P_M$ in the passage 142. On the contrary, when the engine load is reduced to increase the engine suction, the biasing force F of the push rod 192 is reduced to move the valve spool 166 in the first direction to increase the modulator pressure $P_M$ in the passage 142. Thus, the following equation is obtained:

$$P_M A_3 + F = K_2 \tag{3}$$

where F is the force of the spring 176. From the equation (3), the modulator pressure $P_M$ is expressed as $$P_M = (K_2 - F)/A_3$$

The first inlet port 156 opens into the bore 148 between the end wall 178 thereof and the end 180 of the valve spool 166. When the hydraulic fluid pressure in the passage 96 is increased to nearly the line pressure by closing of the drain port 100, the hydraulic fluid pressure in the passage 96 acts on the end 180 of the valve spool 166 to move the valve spool 166 in the first direction. As a result, the effective cross sectional area of the flow path of the line pressure from the passage 164 to the passage 142 is increased to make the modulator pressure $P_M$ equal to or near the line pressure. Accordingly, as is apparent from the equation (2), the line pressure $P_L$ is reduced by such an increase in the modulator pressure $P_M$ when the line pressure is fed from the passage 58 into the cylinder chamber 26 to disengage the clutch 12.

Figure 3:
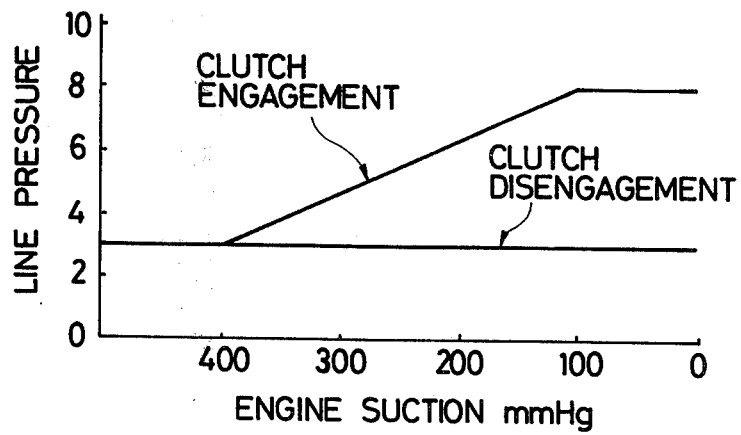
FIG. 3 is a graphic representation of the relationship between the engine suction and a line or control pressure provided by a hydraulic clutch control system according to the invention and the value of which is varied in accordance with the engagement and disengagement of the clutch.

Referring to FIG. 3 of the drawings, there is shown the relationship between the engine suction and the line pressure temporarily reduced during disengagement of the clutch 12 or the valve of which is varied in accordance with the engagement and disengagement of the clutch 12 by the hydraulic control system 40.

Although the invention has been described such that the line pressure developed in the port 90 of the clutch control valve 56 is employed to force the modulator valve 144 in the first direction during disengagement of the clutch 12, it is possible to alternatively employ the other hydraulic fluid pressure developed only during disengagement of the clutch 12 such as, for example, the line pressure fed from the inlet port 62 of the clutch control valve 56 into the outlet port 68 thereof during disengagement of the clutch 12.

It will be appreciated that the invention provides a hydraulic control system for a hydraulic clutch which comprises means for temporarily reducing a line or control pressure fed to the clutch during disengagement of the clutch to a value lower than that of the line pressure fed for engagement of the clutch irrespective of the load of the engine so that the strength, size and weight of the snap ring and the clutch cover are reduced to make the clutch inexpensive.

What is claimed is:

1. A hydraulic control system for a hydraulic clutch for a transmission of a motor vehicle, comprising:
   means for use with a hydraulic clutch for providing in use hydraulic fluid at a control pressure for effecting engagement and disengagement of said clutch;
   passage-defining means receptive of said hydraulic fluid for applying said control pressure to said clutch;
   control means for controlling said control pressure temporarily reducing said control pressure provided during disengagement of said clutch to a suitable value lower than a value of a control pressure provided during engagement of said clutch; and
   regulator means for regulating said control pressure in accordance with an operating condition of an engine of said vehicle;
   said control means including operating means for temporarily causing said regulator means to regulate said control pressure to said suitable value during disengagement of said clutch;
   in which said regulator means comprises a modulator valve for producing a modulator pressure varying in accordance with the load of said engine and movable in a first direction to effect an increase in said modulator pressure and in a second direction to effect a decrease in said modulator pressure, first biasing means urging said modulator valve in said first direction in response to a decrease in said load of said engine and in said second direction in response to an increase in said load of said engine, and a pressure regulator valve for regulating said control pressure in accordance with said modulator pressure and movable in one direction to effect a decrease in said control pressure in response to an increase in said modulator pressure and in another direction to effect an increase in said control pressure in response to a decrease in said modulator pressure, and said operating means for temporarily increasing said modulator pressure during disengagement of said clutch.

2. An hydraulic control system as claimed in claim 1, in which said modulator valve comprises a valve body defining a first bore therein having an inlet port communicating with said passage-defining means, an outlet port provided therein with said modulator pressure, and a drain port, a first valve spool movable in said first and second directions in said first bore and having a first annular groove to reduce and increase the cross sectional area of a flow path of hydraulic fluid from said outlet port to said drain port when said valve spool is moved in said first and second directions, respectively and having a second annular groove to increase and reduce the cross sectional area of a flow path of said hydraulic fluid from said inlet port to said outlet port when said valve spool is moved in said first and second directions, respectively and having a step on which said modulator pressure acts to urge said valve spool in said second direction, and a spring urging said valve spool in said first direction, and said first biasing means comprises a housing having first and second chambers, said first chamber communicating with the atmosphere, a flexible diaphragm separating said first and second chambers from each other, second passage-defining means for conducting an intake passageway vacuum representative of said load of said engine into said second chambe, and a push rod operatively connecting said diaphragm to said valve spool and moving said valve spool in said first and second directions in response to an increase and a decrease in the vacuum in said second chamber, respectively, and said pressure regulator valve comprising a valve body defining a second bore therein which has first and second inlet ports and an outlet port each of which three ports communicate with said second passage-defining means, a drain port and a third inlet port communicating with said outlet port of said modulator valve, a second valve spool movable in said second bore in said first and second directions and formed therein with an annular groove to increase and reduce the cross sectional area of a flow path of hydraulic fluid from said second passage-defining means to drain port when said second valve spool is moved in said first and second directions, respectively and having a step on which said control pressure in said second inlet port acts to urge said second valve spool in said first direction, and a land on which said modulator pressure acts to urge said second valve spool in said first direction, and a spring urging said second valve spool in said second direction, and said pressure increasing means comprising second biasing means for temporarily urging said valve spool of said modulator valve in said first direction independently of said first biasing means during disengagement of said clutch.

3. A hydraulic control system as claimed in claim 2, in which said second biasing means comprises a clutch control valve comprising a valve body defining a third bore therein which has first, second and third inlet ports communicating with said second passage defining means, first and second outlet ports, a first drain port communicating with a drain line, and a second drain port communicating with said third inlet port and with a drain line, a third valve spool slidably fitted in said third bore and formed therein with first and second annular grooves and having and movable between a first position in which said first annular groove provides communication between said first inlet and outlet ports and said second annular grooves provides communication between said second outlet port and said first drain port and a second position in which said first annular groove provides communication between said first outlet and drain ports and said second annular groove provides communication between said second inlet and outlet ports, and a spring urging said third valve spool into said second position, said third valve spool having a land on which said control pressure in said third inlet port acts to move said third valve spool into said first position in opposition to the force of said spring, a second control valve operable to close and open said second drain port, second operating means for causing said second control valve to close said second drain port so that the pressure in said third inlet port is increased to said control pressure to move said third valve spool into said first position and to open said second drain port so that the hydraulic fluid pressure in said third inlet port is drained to allow said spring to force said third valve spool into said second position, and a passage for feeding said control pressure in said third inlet port into said first bore to move said first valve spool in said one direction to increase said modulator pressure to said control pressure when said second drain port is closed, and in which said passage means comprises a first passage for feeding said control pressure from said first outlet port to said clutch for disengagement thereof and a second passage for feeding said control pressure from said second oultet port to said clutch for engagement thereof.

4. A hydraulic control system for a hydraulic clutch of a transmission of a vehicle, comprising:
means for producing a control hydraulic fluid pressure for effecting engagement and disengagement of the clutch;
passage means for feeding said control pressure to the clutch;
regulator means for regulating said control pressure in accordance with an operating condition of an engine of the vehicle; and
operating means for causing said regulator means to temporarily reduce said control pressure produced during disengagement of the clutch to a suitable valve lower than the valve of said control pressure produced during engagement of the clutch,
in which said regulator means comprises a modulator valve for producing a modulator pressure which is temporarily increased during disengagement of the clutch and which is varied in accordance with the load of the engine during engagement of the clutch, and a pressure regulator valve for temporarily reducing said control pressure to said suitable value in response to said increased modulator pressure during disengagement of the clutch and for regulating said control pressure in accordance with said modulator pressure during engagement of the clutch.

5. A hydraulic control system as claimed in claim 4, in which said modulator valve comprises a valve body defining therein a first bore having an outlet port in which said modulator pressure is produced, and an inlet port communicating with said passage means for receiving said control pressure, a first valve spool movable in said first bore by said control pressure during disengagement of the clutch into a position in which the degree of communication between said inlet and outlet ports is increased to a value which increases said modulator pressure to a valve approximately equal to said control pressure, and first biasing means for, in accordance with increase and decrease in the load of the engine respectively during engagement of the clutch, moving said first valve spool in opposite directions in which the degree of communication between said inlet and outlet ports is reduced and increased to reduce and increase said modulator pressure, said pressure regulator valve comprises a valve body defining a second bore which communicates with said passage means and has a drain port, and a second valve spool movable in said second bore by said increased modulator pressure during disengagement of the clutch into a position in which the degree of communication between said passage means and said drain port is increased to a value which reduces said control pressure to said suitable value and by said modulator pressure during engagement of the clutch in such a manner as to control the communcation between said passage means and said drain port thereby to regulate said control pressure in accordance with the load of the engine, and said operating means comprises second biasing means for causing said control pressure to temporarily move said first valve spool into the first-mentioned position during disengagement of the clutch.

6. A hydraulic control system for a hydraulic clutch of a transmission of a vehicle having an internal combustion engine, comprising:
- means for producing a control hydraulic fluid pressure for effecting engagement and disengagement of the clutch;
- means defining a passage for feeding said control pressure to the cluch;
- a modulator valve for producing a modulator pressure in accordance with the load of the engine;
- a pressure regulator valve for regulating said control pressure in accordance with said modulator pressure; and
- means for temporarily varying said modulator pressure to a suitable value for temporarily reducing said control pressure to a value lower than the value of said control pressure produced during engagement of the clutch during disengagement of the clutch.

* * * * *